United States Patent [19]
Folkerts et al.

[11] 3,751,002
[45] Aug. 7, 1973

[54] FLUID COUPLING FOR HIGH PRESSURE SPOOL VALVE HYDRAULIC POWER STEERING GEAR

[75] Inventors: Walter E. Folkerts, Hazel Park; Reginald Y. Jamieson, all of Huntington Woods, Mich.

[73] Assignee: Chrysler Corporation, Highland Park, Mich.

[22] Filed: Mar. 27, 1972

[21] Appl. No.: 238,075

[52] U.S. Cl. ............................. 251/148, 285/334.4
[51] Int. Cl. ............................................ F16l 19/02
[58] Field of Search ................. 251/148; 285/334.4, 285/334.5, 356, 211, 212, 213, 357, 353, 354, 364, 219, 220, 221, 222

[56] References Cited
UNITED STATES PATENTS

| | | | |
|---|---|---|---|
| 3,393,930 | 7/1968 | Ziherl et al. ..................... | 285/354 X |
| 3,092,404 | 6/1963 | MacWilliam ..................... | 285/354 X |
| 2,522,195 | 9/1950 | Richardson ..................... | 285/334.5 X |
| 2,983,506 | 5/1961 | Bertsch et al. .................. | 285/334.4 X |
| 3,363,649 | 1/1968 | Schott ........................ | 137/625.69 X |

FOREIGN PATENTS OR APPLICATIONS

1,027,971   Great Britain ..................... 285/356

Primary Examiner—William R. Cline
Attorney—Jay C. Taylor

[57] ABSTRACT

A valve housing for an automobile hydraulic power steering gear and integrated spool valve is provided with a tube receiving opening having a threaded outer portion, an annular coaxial pilot portion at the inner end of the threaded portion, and a coaxial conical guide portion converging inwardly from the pilot portion and opening axially into a transverse bore for a spool valve that controls operation of the gear. The outer end of the conical opening is of smaller diameter than the pilot opening and is defined by an annular clamping shoulder of the housing at the inner end of the pilot opening. A tube for conducting high pressure hydraulic fluid is provided with a radial enlargement spaced from its inner end. An O-ring is seated on the tube between the enlargement and a flared inner end of the tube. The flared end retains the O-ring on the tube until the coupling is assembled and also shields the O-ring from injury when the flared end is inserted into the tube receiving opening during the assembly and guided by the conical opening to a position whereat the annular enlargement seats at the clamping shoulder. An externally threaded nut engaged within the threaded opening clamps the enlargement against the shoulder and deforms the O-ring into sealing engagement with the adjacent sidewalls of the tube and concial guide opening.

14 Claims, 3 Drawing Figures

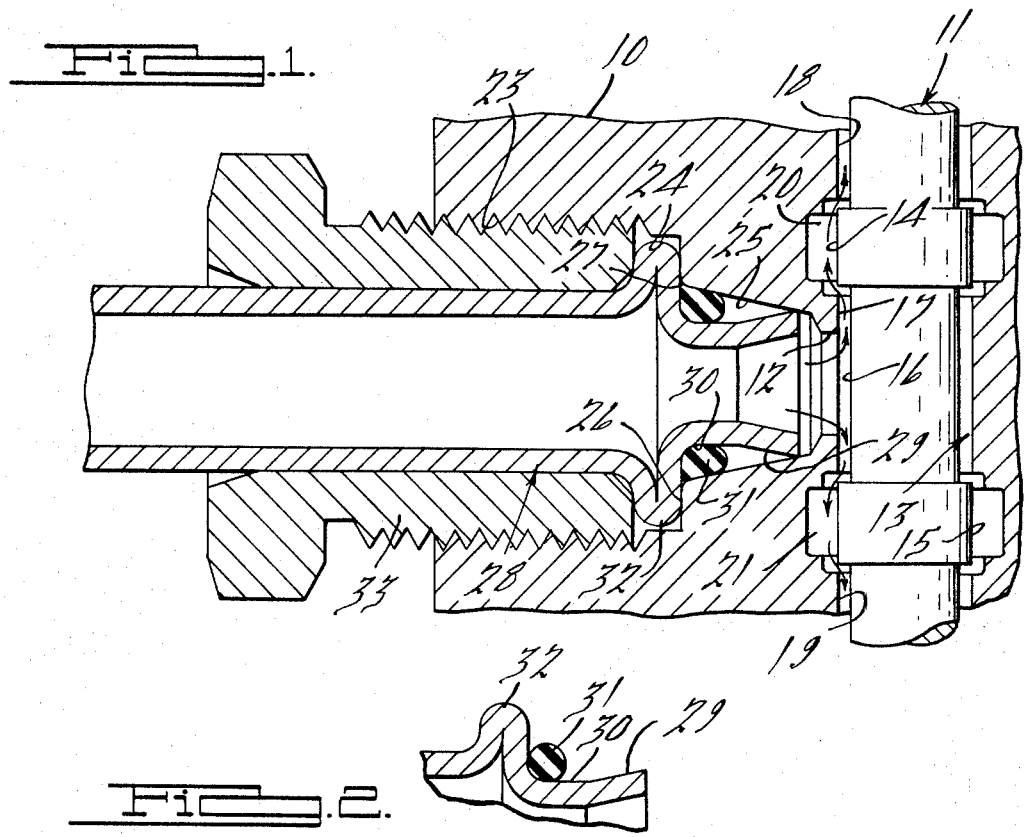
Fig. 1.
Fig. 2.
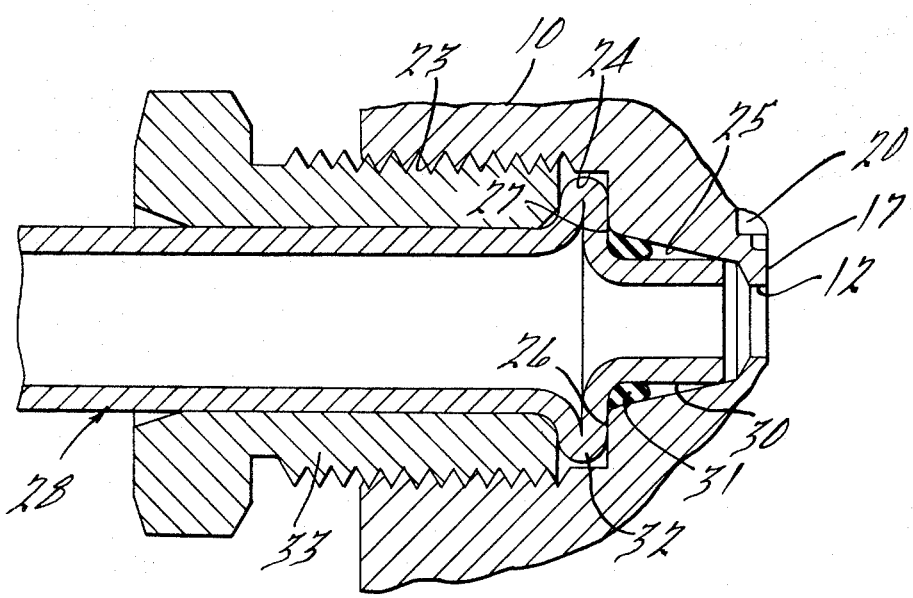
Fig. 3.

FLUID COUPLING FOR HIGH PRESSURE SPOOL VALVE HYDRAULIC POWER STEERING GEAR

BACKGROUND AND SUMMARY OF THE INVENTION

This invention relates to fluid couplings and in particular to a coupling employed to connect a tube for high pressure hydraulic fluid with the housing for an automobile power steering gear. Such couplings heretofore have comprised a screw threaded opening into the housing having a radially offset annular clamping shoulder at an inner portion thereof to define a reduced diameter seal receiving opening and having a second radially offset shoulder inwardly of the clamping shoulder to define a still further reduced diameter pilot opening adapted to receive and guide an inner end of the tube into coaxial alignment with the threaded opening. The tube is provided with an annular enlargement adapted to be clamped against the clamping shoulder when the inner end of the tube is inserted into the pilot opening. During assembly of the coupling, a resiliently deformable O-ring is inserted on the inner end of the tube adjacent the annular enlargement and is deformed within the seal receiving opening into sealing engagement with the adjacent sidewalls of the latter and tube when the tube enlargement is clamped against the clamping shoulder.

A serious objection to such couplings available heretofore arises from the spatial requirements for the coupling and housing. For reasons of economy and operating efficiency, the valve which controls operation of the steering gear is integrated with the gear housing. The limited dimensions of the resulting housing does not permit adequate axial length for the pilot opening. In consequence, the tube tends to cock when it is assembled within the tube receiving opening of the housing, rendering assembly difficult and frequently causing the O-ring to be cut as it is forced into the annular seal receiving opening during assembly.

It is accordingly an important object of the present invention to provide an improved coupling of the above character wherein assembly is simplified and cutting of the O-ring is substantially eliminated, and which by virtue of its economy and ease of assembly and disassembly is suitable to provide a leak proof fluid coupling for many applications, whether high pressure or low pressure, as for example in air conditioning systems, fluid actuated brake systems, central hydraulic power systems, and the like.

Other and more specific objects are to provide such a coupling wherein the inner pilot opening is eliminated and wherein the inner end of the tube is guided by cam action into the large end of a conical guide opening extending coaxially inwardly within the housing from the threaded opening, and wherein the inner end of the tube is flared to protect the O-ring from being cut by engagement with the housing as the inner end is inserted into the conical opening. The O-ring is stretched to fit over the flared inner end of the tube and thereafter seats on the tube between the flared inner end and the enlargement of the tube, so that accidental displacement of the O-ring from the tube during assembly of the coupling is also avoided.

Another object is to provide an annular pilot opening at the inner end of the threaded opening adapted to extend around the annular enlargement of the tube and in cooperation with the cam action of the guide opening on the inner end of the tube to locate the latter coaxially within the opening to facilitate screwing an externally threaded clamping nut into the threaded opening to clamp the enlargement against the annular shoulder of the housing.

Other objects of this invention will appear in the following description and appended claims, reference being had to the accompanying drawings forming a part of this specification wherein like reference characters designate corresponding parts in the several views.

FIG. 1 is a diagrammatic view along the axes of a coupling and power steering valve embodying the present invention.

FIG. 2 is a fragmentary view showing the O-ring located on the inner end of the tube of FIG. 1 prior to assembly of the coupling.

FIG. 3 is a view similar to FIG. 1 showing a modification.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGS. 1 and 2, a portion of a cast iron housing 10 for an automobile hydraulic power steering gear and integrated spool valve 11 is provided with an inlet port 12 which opens transversely into a chamber 13 of circular cross section for the valve 11. Preferably the axes of the port 12 and spool valve chamber intersect at right angles, although these axes may lie in different planes offset slightly from each other.

The valve 11 is shiftable axially of itself within its chamber 13 and is provided with a pair of cylindrical lands 14 and 15 spaced axially by a central portion 16 of reduced diameter effective to provide an annular opening around the valve 11 confronting the port 12 to receive hydraulic fluid therefrom. A central cylindrical land 17 of the housing 10 contains the port 12 and defines a portion of the chamber 13. Also defining the chamber 13 are cylindrical lands 18 and 19 of the housing 10, the land 18 being spaced axially rightward from the land 17 by an annular enlargement 20 of the chamber 13, and the land 19 being spaced axially leftward from the land 17 by a similar annular enlargement 21 of the chamber 13.

In accordance with the structure described, hydraulic fluid entering chamber 13 through port 12 will flow in the direction of the arrows into the chamber enlargements 20 and 21 through the annular openings illustrated between the land 17 and the lands 14 and 15 respectively. The chambers 20 and 21 may be connected in accordance with conventional practice with opposite sides of a fluid actuated motor to maintain the latter in a neutral or straight ahead steering position. Upon shifting of the spool valve 11 to the left, as for example during a steering operation, the communication between port 12 and chamber 20 will be progressively closed and an annular opening between lands 14 and 18 will be progressively opened. Simultaneously, the communication between port 12 and chamber 21 will be increased and the effective seal between lands 15 and 19 will be increased. Accordingly, the pressure in chamber 20 will be reduced and the pressure in chamber 21 will be increased to actuate the power steering motor to effect a left turn for example. The valve chamber 13 to the right of land 14 and to the left of land 15 is conventionally connected to a drain line so that hydraulic fluid within chamber 20 will be returned to an exhaust or drain line. It is apparent that a symmetrical action will take place upon movement of the spool valve 11 to the right, such that the pressure in chamber 21 will be decreased and the pressure in chamber 20 will be increased to effect steering in the opposite direction.

Port 12 communicates coaxially with the inner end of a tube receiving opening in housing 10 comprising an outer internally threaded portion 23 which opens outwardly of the housing, a cylindrical pilot portion 24 at the inner end of opening 23, and a conical guide portion 25 which converges inwardly toward port 12 at an angle of approximately 12° to its axis. The large outer end of conical opening 25 has a smaller diameter than the pilot opening 24 and is defined by an annular clamping shoulder 26 located at the inner end of the pilot opening 24. A rounded edge or juncture 27 is provided between the inner circumference of shoulder 26 and the outer end of the conical guide opening 25.

A steel tube 28 suitable for conducting hydraulic fluid has a flared inner end 29 adapted to be inserted coaxially into the guide opening 25 to adjacent the latters inner end. Outwardly out of the flared end 29 is a reduced diameter portion 30 of the tube 28 on which is seated a sealing ring 31 of resilient deformable rubber-like material, as for example a synthetic rubber O-ring. The latter is adapted to be stretched over the flared end 29 for confinement on the tube portion 30 adjacent the inner surface of an annular enlargement 32 of the tube 26. The outer diameter of the enlargement 32 is dimensioned to fit closely but freely within the guide opening 24, the diameter of which is approximately the same and in no event greater than the smaller internal or pitch diameter of the threaded portion 23.

Outwardly of the enlargement 32, the external diameter of the tube 28 is greater than that of the reduced portion 30, so that the small diameter of the outer wall or surface of enlargement 32 is less than the small diameter of the inner surface or wall of that enlargement, whereby the rigidity of the enlargement 32 is increased. An externally threaded nut 33 sleeved over the body of tube 28 outwardly of enlargement 32 is screwed tightly into the threaded portion 23 and has an inner end engaged with the enlargement 32 to clamp the latter against shoulder 26 and deform the sealing ring 31 within the guide portion 25 into sealing engagement with the sidewalls of the latter and adjacent portions of the tube 28.

In accordance with the foregoing, prior to assembly of the coupling, the O-ring 31 may be stretched and forced over the flared end 29 and positively confined coaxially on the reduced tube portion 30 between the flared end 29 and enlargement 32, FIG. 2. In this regard, the inner diameter of the sealing ring 31 in the unstretched condition is smaller than the maximum diameter of the flared end 29. Handling and shipping of the tube 28 with the assembled sealing ring 31 is consequently facilitated prior to assembly of the tube 28 with the housing 10. The final assembly is accomplished by inserting the flared end 29 and the assembled sealing ring 31 into the threaded opening 23 and thence into the guide opening 25, whereby the flared end is guided to a position approximately coaxial with the threaded opening 23. As the enlargement 32 enters the pilot opening 24, the coaxial alignment is more closely approximated by virtue of the axial spacing of the flared inner end 29 from the enlargement 32. Also by virtue of the flared end 29 in cooperation with the enlarged outer end of the guide opening 25 and the rounded edge 27, the O-ring 31 is readily cammed into the guide opening 25 without being cut or damaged.

In the latter regard, as the flared end 29 is cammed into the guide opening 25, the enlargement 32 will enter the pilot 24 about the same time the O-ring 31 first engages the edge 27. Thus the tube 28 will be engaged and maintained in the desired coaxial alignment at two axially spaced locations, whereby cocking of the tube 28 is avoided. The rounded edge 27 will meet and deform the O-ring substantially uniformly around its circumference, such that localized overloading of the O-ring 31, which might otherwise cut the same as it is deformed into its sealing engagement shown, is accordingly avoided.

The conical angle of the guide opening 25 may be between approximately 10° and 20° to the major axis. An angle of approximately 12° plus or minus 1° is preferred in order to provide a coupling of minimum length axially of the tube 28. If the conical angle is appreciably shallower than 10°, the axial dimension of the opening 25 will necessarily be increased to prevent cutting of the O-ring 31. If the conical angle is appreciably greater than 20°, the annular space to be filled between tube 28 and opening 25 will be too great and will necessitate too large a cross sectional diameter for the O-ring 31.

After the tube 28 is inserted into the housing substantially to the position shown, the nut 33 sleeved over the outer end of tube 28 is screwed tightly into the threaded opening 23 until the inner end of the nut 33 engages and clamps the enlargement 32 against the shoulder 26, thereby to effect deformation of the sealing ring 31 into the final position of sealing contact shown in FIG. 1.

FIG. 3 illustrates a modification of the present invention similar in all respects to that illustrated in FIG. 1, except for the flared end 29. It has been found that the tube 28 may be fabricated with the flared end 29 without cost penalty, so that the embodiment of FIG. 1 is usally preferred because of the added shielding of the O-ring 31 against damage and because of the simplified assembly permitted by positively retaining the O-ring 31 on the tube portion 30. In certain embodiments where an O-ring of smaller cross sectional diameter is necessary, many of the advantages of the present invention may be achieved without recourse to the flared end 29. Damage to the O-ring 31 during assembly is still minimized in the structure illustrated in FIG. 3 and the advantages of an axially shortened coupling is also achieved.

We claim:
1. In a fluid coupling,
  1. a member having
    a. a guide opening having an enlarged outer end and
    b. an annular radial shoulder around said outer end,
  2. a tube for conducting fluid having a. an inner end insertable into the outer end of said guide opening,
b. an annular enlargement spaced from said inner end of said tube and adapted to be clamped against said annular shoulder when said inner end of said tube is inserted to its innermost position within said guide opening,
c. a portion of said tube inwardly of said annular enlargement having a smaller external diameter than the diameter of the outer end of said guide opening to provide an annular space within the latter for a deformable sealing ring between said tube and member, and
d. means for camming and guiding the inner end of said tube to said innermost position comprising an interior surface of said guide opening coaxial with said outer end and converging axially throughout its axial extent from said outer end to a coaxial inner portion of said guide opening dimensioned to confine the inner end of said tube closely in guided relationship when the latter inner end is at said innermost position,
3. a deformable sealing ring adapted to fit closely around said tube inwardly of said annular enlargement and to be deformed into sealing engagement with said member and tube when said inner end of said tube is inserted into said guide opening and said annular enlargement is clamped against said annular shoulder, and
4. clamping means engageable with said member and annular enlargement for clamping the latter against said annular shoulder.

2. In a coupling according to claim 1, the inner end of said tube being flared to an outer diameter greater than the inner diameter of said sealing ring, and said sealing ring being resiliently yieldable for assembly on said tube over said flared end for retention between the latter and said annular enlargement.

3. In a coupling according to claim 1, said member having an internally threaded outwardly opening tube receiving opening communicating coaxially with the outer end of said guide opening and shoulder and being dimensioned to receive said annular enlargement seated against said annular shoulder, said clamping means comprising a nut adapted to be sleeved over said tube within said tube receiving opening and to be screwed into the latter, said nut having an inner end engageable with said enlargement to clamp the latter against said shoulder upon tightening said nut into said tube receiving opening.

4. In a coupling according to claim 3, said tube receiving opening having an annular pilot portion at its inner end adjacent said annular shoulder and dimensioned to extend around and locate the outer periphery of said annular enlargement coaxially with respect to said guide opening when said enlargement is seated against said shoulder, the diameter of said pilot portion being no larger than the internal pitch diameter of said threaded opening.

5. In a coupling according to claim 4, means for retaining said sealing ring on said tube and to shield said ring against being cut by portions of said housing during assembly of said coupling comprising the inner end of said tube flared to an outer diameter greater than the inner diameter of said sealing ring, the latter being resiliently yieldable to pass over said flared inner end and to be yieldingly retained on said tube between said flared inner end and enlargement.

6. In a coupling according to claim 1, said interior surface of said guide opening being conical and having sides converging toward its axis at approximately a 12° angle.

7. In a coupling according to claim 1, said interior surface converging axially at least to said innermost position of the inner end of said tube and to a diameter at least as small as the diameter of the latter inner end.

8. In a coupling according to claim 7, the interior surface of said guide opening converging conically at an angle approximately 12° to the axis of said guide opening.

9. In a coupling according to claim 7, means for retaining said sealing ring on said tube and to shield said ring against being cut by portions of said housing during assembly of said coupling comprising the inner end of said tube flared to an outer diameter greater than the inner diameter of said sealing ring, the latter being resiliently yieldable to pass over said flared inner end and to be yieldingly retained on said tube between said flared inner end and enlargement.

10. In a coupling according to claim 9, the interior surface of said guide opening converging conically at an angle approximately 12° to the axis of said guide opening.

11. In a coupling according to claim 1, said member comprising a valve housing having a bore for a spool valve extending transversely to the axis of said guide opening, said bore having a coaxial annular land and having a port extending through said land axially of said guide opening and communicating with the inner end of the latter.

12. In a coupling according to claim 11, means for retaining said sealing ring on said tube and to shield said ring against being cut by portions of said housing during assembly of said coupling comprising the inner end of said tube flared to an outer diameter greater than the inner diameter of said sealing ring, the latter being resiliently yieldable to pass over said flared inner end and to be yieldingly retained on said tube between said flared inner end and enlargement.

13. In a coupling according to claim 12, said member having an internally threaded outwardly opening tube receiving opening communicating coaxially with the outer end of said guide opening and shoulder and being dimensioned to receive said annular enlargement seated against said annular shoulder, said clamping means comprising a nut adapted to be sleeved over said tube within said tube receiving opening and to be screwed into the latter, said nut having an inner end engageable with said enlargement to clamp the latter against said shoulder upon tightening said nut into said tube receiving opening.

14. In a coupling according to claim 13, said guide opening being conical and having sides converging toward its axis at an angle of approximately 12°.

* * * * *